United States Patent [19]

Laney

[11] 3,781,544
[45] Dec. 25, 1973

[54] PROBABILITY BASED SELECTIVE PULSE HEIGHT DISCRIMINATION IN SCINTILLATION DETECTORS

[75] Inventor: Barton H. Laney, Deerfield, Ill.
[73] Assignee: G. D. Searle & Co., Chicago, Ill.
[22] Filed: Sept. 27, 1971
[21] Appl. No.: 184,065

Related U.S. Application Data
[63] Continuation-in-part of Ser. No. 792,717, Jan. 21, 1969.

[52] U.S. Cl. .................. 250/71.5 R, 250/106 SC
[51] Int. Cl. ............................................. G01t 1/20
[58] Field of Search .................. 250/71.5 R, 106 SC

[56] References Cited
UNITED STATES PATENTS

| | | | |
|---|---|---|---|
| 3,320,419 | 5/1967 | Thomas et al. | 250/106 SC |
| 3,484,703 | 12/1969 | Thieberger | 250/71.5 R |
| 3,388,254 | 6/1968 | Haller et al. | 250/71.5 R |
| 3,487,222 | 12/1969 | Martens | 250/71.5 R |
| 3,515,878 | 6/1970 | Ried, Jr. | 250/71.5 R |

Primary Examiner—James W. Lawrence
Assistant Examiner—B. C. Anderson
Attorney—Lowell C. Bergstedt et al.

[57] ABSTRACT

Pulse height discrimination in a coincidence counting scintillation detector on the basis of the probability of occurrence of a radioactive event having the pulse amplitudes produced, as opposed to the probability of occurrence of background noise having the same pulse amplitudes. The coincident pulses accepted are those which conform to a function that includes at least a major portion of pulse combinations having at least a prerequisite probability of occurrence of a radioactive event. The determinative function is produced by a function generating means, and the values of the function vary with the coincident pulse amplitude sum.

9 Claims, 11 Drawing Figures

PATENTED DEC 25 1973 3,781,544

INVENTOR.
BARTON H. LANEY
BY
Charles H. Thomas Jr.

INVENTOR.
BARTON H. LANEY
BY
Charles H. Thomas Jr.

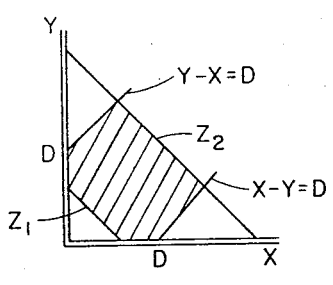
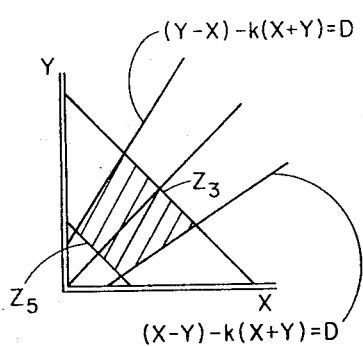
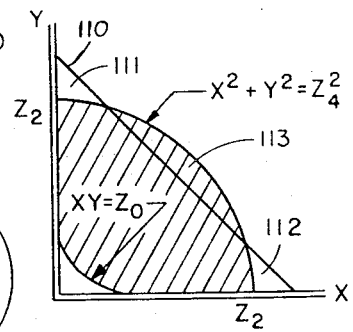
FIG. 4  FIG. 5  FIG. 6
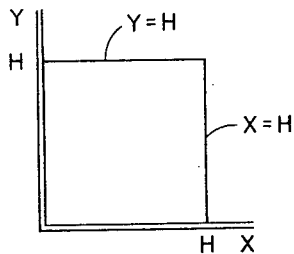
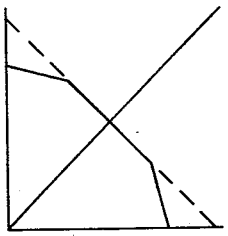
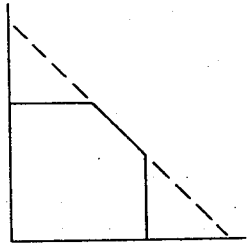
FIG. 7  FIG. 8  FIG. 9
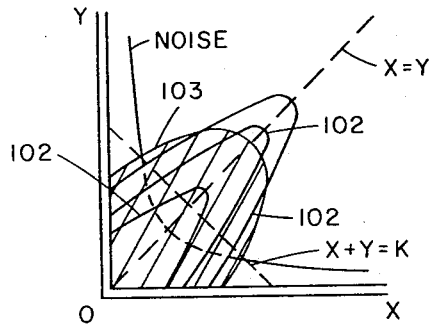
FIG. 10
INVENTOR.
BARTON H. LANEY
BY
Charles N. Thomas Jr

PROBABILITY BASED SELECTIVE PULSE HEIGHT DISCRIMINATION IN SCINTILLATION DETECTORS

This is a continuation-in-part of U.S. Pat. application Ser. No. 792,717 filed on Jan. 21, 1969.

This invention is designed to eliminate from tabulation background noise and spurious coincident signals in a coincidence counting scintillation detector, particularly those used in the technique of liquid scintillation detection. A significant portion of background noise in liquid scintillation detection systems is attributable to optical crosstalk between photodetectors. Optical crosstalk is the coupling of light emanating from one phototube to another. Light produced in one phototube and detected by the other will add to the coincidence background. The character of the light emitted depends upon the material and structure of the phototubes, the operating voltage, gain, amount of shielding, and the efficiency of optical coupling used between the sample and each phototube. Conventional optical techniques to minimize the cross coupling such as masking, light traps, polarizers and filters, usually degrade the figure of merit ($E^2/B$) as well as the detection efficiency, where E is the efficiency and B is the background. Conventionally in coincidence counting, each of the coincident pulse amplitudes is measured against a preselected fixed threshold value. If both pulses meet the threshold value, the pulse amplitude sum is measured to determine if it lies within a preselected fixed minimum and maximum value of pulse height sums, or "window" in a pulse height discriminator. If both of these tests are met, the coincident pulses cause a pulse count to be recorded.

The use of these criteria in liquid scintillation pulse-height analysis has been conventional for many years, and has, prior to the present invention, been accepted as producing the best possible discrimination between signal and noise in low-energy liquid scintillation counting, although residual noise pulses necessarily remain. By raising the minimum level of amplitude which is accepted as forming a coincidence, the noise background existing in any "window" is reduced, but such reduction is accompanied by a reduction in the counting efficiency for weak scintillations. Much effort has been devoted to improvement of photomultipliers as regards noise reduction, and the better liquid scintillation systems normally incorporate provisions for refrigeration and other precautions designed to minimize photomultiplier noise.

The present invention resides in the utilization of the recognition that certain pulse height amplitude combinations are more probably attributable to crosstalk or other background noise than are other pulse height amplitude combinations having the same pulse height amplitude sum. Furthermore, the probability of background noise as the source of coincident pulses is greatest when a large degree of amplitude inequality exists between the individual pulses of the coincident pulse pair. At a specific probability of occurrence of a true radioactive event, the pulse differential diminishes at the lower and upper ends of the normal spectrum of pulse amplitude sums for a particular radiation source of interest, as compared with the central region of the same spectrum.

Viewed another way, coincident pulses of a specific probability of occurrence of valid radioactive events of interest may be recorded and all other pulses rejected by tolerating only a maximum degree of disparity pulse amplitude of the coincident pulses. This acceptable degree of disparity varies as a function of pulse amplitude sum and is greater at the central portion of the normal pulse amplitude sum spectrum for a particular radiation source than at either the high or low extremes of that spectrum. Thus by merely rejecting pulse pairs exceeding a predetermined disparity, for a given pulse sum, a substantial portion of noise background pulses of substantial amplitude heretofore counted along with signal pulses can be eliminated without appreciable reduction in counting efficiency for true scintillation events, and this may be done by blocking counting of summed pulses of excessive differential.

In determining the maximum permitted inequality (differential, ratio, etc.) for any sum, there enter two factors of relative probability, first, the probability distribution or spectrum of relative pulse sizes of coincident undesired pulses and coincident desired pulses, respectively, at that particular sum, and second, the overall "efficiency," or probability of detection of that particular amplitude sum. The general patterns of the probability distributions of signal pulses and noise pulses have already been generally described. However, to more particularly define acceptable pulses, the same principles of statistical analysis may also be used to improve the statistical separation of pulses produced by different isotopes and also of pulses produced by background radiation in individual photomultiplier tube systems.

The acceptance criteria for pulses of any given sum, rather than being stated in terms of permitted inequality, may also be described in terms of the threshold value required for counting in each tube (heretofore the same for all sums). The threshold value for one tube will vary in accordance with the value of, and in the same direction as, the pulse amplitude from the other tube.

It can be seen that the pulse acceptance limits be described either in terms of pulse amplitude differential, or in terms of the amplitude threshold as a function of sum. From the standpoint of the general method of the invention, such descriptions are wholly equivalent, being mere differences in mode of description of the concept. From the standpoint of the apparatus aspect of the invention, however, the implementation suggested by differing descriptions of the same method can result in substantially different constructions of novel apparatus which are nevertheless closely similar in ultimate function or purpose and may be considered wholly equivalent as regards the broader teachings of the apparatus aspect of the invention.

In one broad aspect, this invention may be considered as, in a method of radioactivity measurement comprising exposing a plurality of photomultipliers to scintillations occurring in response to radioactive emissions to product a plurality of contemporaneous individual voltage pulses to be analyzed in combinations of two; and generating electrical output signals from said photomultiplier proportional to the respective amplitudes of coincident pulses that exceed predetermined prerequisite threshold amplitudes, the improvement wherein discrimination is made between combinations of pulses on the basis of the probability of occurrence of a radioactive event having the pulse amplitudes produced, as opposed to the probability of occurrence of background noise having the same pulse amplitudes, by accepting coincident pulses conforming to a function that includes at least a major portion of pulse combinations having at least a prerequisite probability of occurrence of a radioactive event, and by rejecting those coincident pulses failing to conform to the aforesaid function; whereby output signals to a scintillation counter are produced representing those coincident pulses which are accepted.

In another broad aspect this invention is, in a liquid scintillation counting apparatus having a chamber adapted to receive a sample to be measured, first and second photomultipliers for producing electrical voltage pulses in response to and in a magnitude proportional to energy emitted by scintillations in said sample, coincidence detection means, a pulse summing circuit, and level discrimination and counting means including an adjustable minimum level discriminator, the improvement wherein said minimum level discriminator further comprises a first automatically adjustable function generating means for establishing a minimum pulse acceptance level as controlled by the pulse sum of voltage pulses from the photomultipliers.

In another form, this invention is, in an apparatus for scintillation counting including a plurality of photomultipliers interconnected in combinations of two for generating coincident input voltage pulses in response to scintillations; a pulse summing means connected to said photomultipliers for producing a pulse sum; pulse height analysis means with adjustable minimum level pulse discriminators connected to said photomultipliers; and pulse counting means for tabulating detected coincident pulses having acceptable pulse energy characteristics according to said pulse height analysis means, the improvement comprising a function generating means for determining a permissible input voltage pulse differential limit according to said pulse sum, a subtracting means connected to said photomultipliers for determining the actual pulse differential of coincident pulses, and a comparator means for comparing the actual pulse differential with the permissible input voltage pulse differential limit for the pulse sum of the coincident pulses, whereby tabulation of those coincident pulses having an actual pulse differential greater than said permissible pulse differential limit is blocked.

In addition to utility in discriminating between signal pulses and noise pulses, the relative pulse-height information of the coincident pulses may be employed to improve the resolution or separation of isotopes of different energies counted in separate counting channels. In this instance, the pulses from the undesired radioactive source in a counting channel are the equivalent of background noise. Heretofore discrimination using separate counting channels has likewise been performed on mere summed amplitude. In accordance with the present invention, there is no single sum which defines the upper limit of acceptance of the higher-energy isotope and the lower limit of acceptance of the lower energy isotope. Instead, the criteria for acceptance also includes the relative values of the individual pulses for any given sum, and the value of the sum is only one of the parameters of pulse selection.

A more complete understanding of the above summary, together with further teachings of the invention and their purpose and advantage, will be obtained by referring to the annexed drawing, in which.

FIG. 4 schematically illustrates the acceptance criteria of one embodiment of this invention.

FIG. 5 schematically illustrates the acceptance criteria of a preferred embodiment of this invention.

FIG. 6 shows, in similar representation, the acceptance criteria of the embodiment of this invention preferred for the counting of tritium radiation.

FIGS. 7, 8, and 9 schematically illustrate various discrimination criteria of simple types embodying the teachings of the invention.

FIG. 10 is a generally similar plot illustrating the acceptance criteria of an embodiment of this invention preferred for counting carbon-14 radiation.

Figure 11:
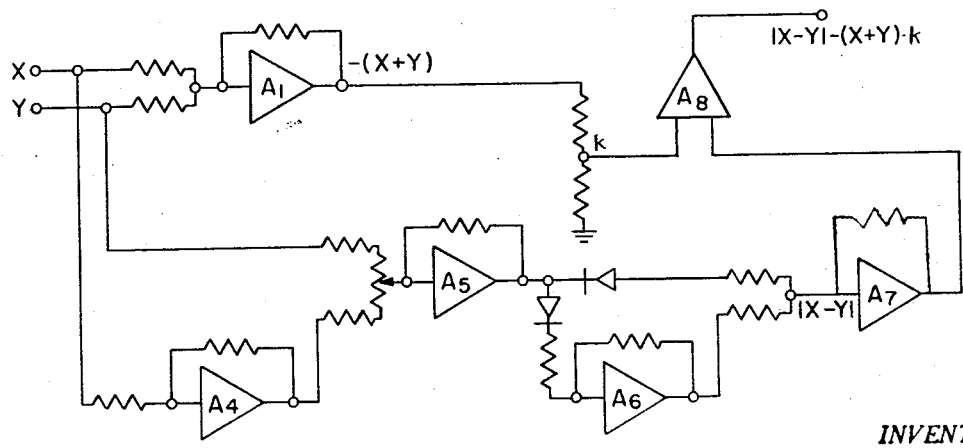
Figure 3:
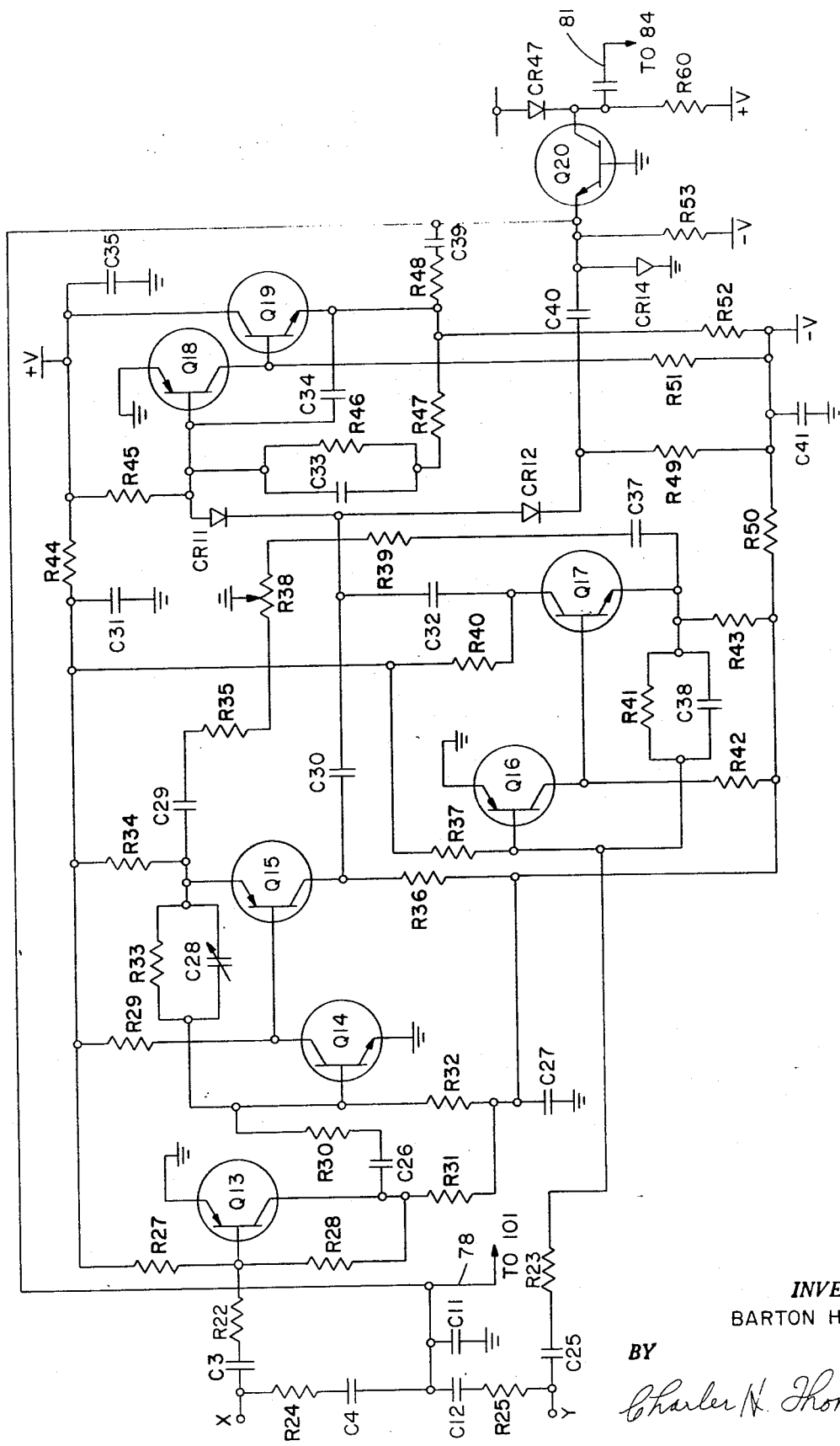
FIG. 3 is a circuit diagram of a portion of the liquid scintillation counter of FIG. 2.

FIG. 11 is a schematic diagram illustrating the more general form of the circuitry of FIG. 3.

Figure 1:
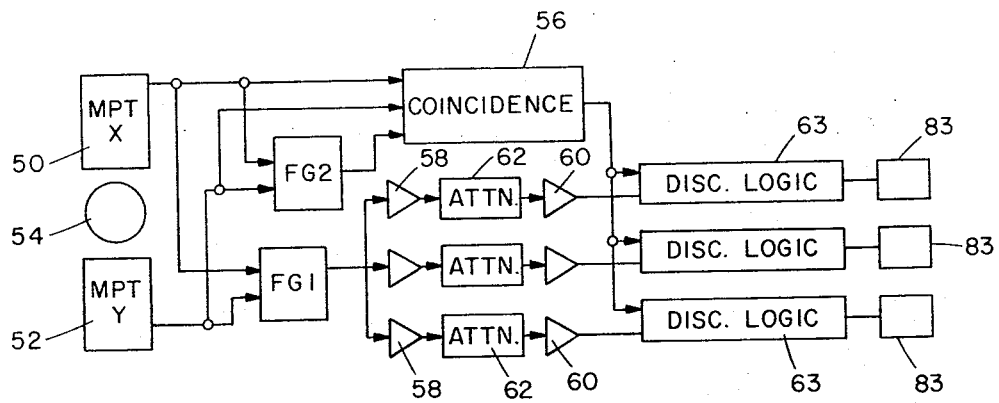
FIG. 1 is a block diagram of a liquid scintillation counter constructed according to this invention.

There is shown in FIG. 1 a block diagram of an overall three-channel liquid scintillation counting apparatus employing the present invention. The system employs first and second multiplier phototubes X and Y at 50 and 52 disposed about a counting chamber receiving the light scintillation from the sample 54. Electrical voltage pulse outputs from the phototubes are produced in a magnitude proportional to energy emitted by scintillations in sample 54, and are suitably amplified (omitted from the drawings along with the conventional delay devices, etc.) and fed to the inputs of the usual threshold coincidence system 56 which includes discriminators fixing the usual minimum threshold values. Thereafter, gating leads are connected to the level discrimination means 63 and the counting means 83. In addition, the outputs are fed to the analogue function generator FG1, and the output of this function generator is fed in parallel to three counting channels, each provided with the usual amplifying stages 58 and 60 and interposed attenuator 62 feeding the level discrimination means 63 the same as that used in conventional channels, with each having a "window" accepting pulses for counting only within the preset limits.

The system as thus far described will be recognized as identical with a conventional summation system, with the sole exception that the first automatically adjustable function generator FG1 replaces the conventional pulse adder and establishes a minimum pulse acceptance level as controlled by the pulse sum of voltage pulses from the photomultipliers. The function generating means FG1 thus defines a permissible pulse amplitude differential for each pulse sum represented by an acceptance area for each channel in which the pulses of any given sum are discriminated on the basis of their difference as well as their sum.

The function generated may vary considerably depending upon the radioactive source and the spectrum and under scrutiny. For example, the function generating means FG1 which is used to produce the acceptance area of FIG. 4 includes a function defining circuit which defines the minimum pulse acceptance level as the difference between the amplitudes of the voltage pulses from the photomultipliers minus a constant. That is, as shown by the hatched acceptance area, there are excluded all pulses which do not lie between the lines $Y - X = D$ and $X - Y = D$, i.e., all pulses having greater than a maximum permitted differential which is shown constant for all sums in FIG. 4. By means of the level discrimination means 63, pulses of sum greater than $Z_2$ are excluded from counting, as are pulses of sum less than $Z_1$. It should be noted that in the lower amplitude region, the function generating means produces a value less than the minimum threshold value determined by threshold coincidence system 56. In this case, no pulse is recorded since no gating signal is received from threshold coincidence system 56, and the threshold discrimination means, in effect, blocks coincident pulses where either of the pulses is not in excess of the predetermined fixed threshold level. Counting of coincident input voltage pulses of small amplitude is thereby governed by the threshold discrimination means.

Although the addition of discrimination on the basis of a constant maximum permitted differential, as in FIG. 4, produces substantial improvement in the counting of carbon-14, and can also produce improvement for high isotopes, any single setting of the differential is wholly unsuitable for use with a variety of isotopes. In FIG. 5 there is shown the operation of a "skewed" differential discrimination system added to the conventional sum-discrimination system. Here the permitted absolute value of the differential increases with the sum, the limits of permitted differential increasing with increasing sum values. As shown by the legends on the skewed acceptance limits in FIG. 5, such discrimination may be accomplished by limiting the absolute value of the resultant obtained by subtracting a fraction K of the pulse amplitude sum from the pulse amplitude difference, this fraction being selected either by examination of contour data taken for the system (using the oscilloscope technique mentioned or a multichannel analyzer), or by mere empirical experiment. As another example, a constant voltage value C may be added to each of the phototube outputs, and the ratio of $X + C$ to $Y + C$ may be generated and the pulse accepted only if the ratio falls between a prescribed number and its reciprocal.

By simple addition to a typical commercial liquid scintillation system of a permanently set skewed differential discrimination circuit producing the acceptance characteristics shown in FIG. 5, there has been achieved a 16 percent improvement in $E^2/B$ in the counting of carbon-14, not only without impairment of the performance for other isotopes, but with the realization of a measurable improvement for somewhat higher energies such as phosphorus-32. When the upper and lower sum-windows were set for dual label counting of tritium and carbon-14 (in which $E^2/B$ in the carbon channel is necessarily less than the optimum obtainable for single-isotope counting) the improvement in $E^2/B$ for the carbon channel was approximately 30 percent.

The greatest performance advantage of this simple form of the invention is obtained in the counting of carbon-14. In the counting of isotopes of successively higher energies, in which higher values of $E^2/B$ can readily be obtained in an ordinary sum-window, the improvement in performance necessarily decreases. At the other extreme, as will now be seen, the utilization of the invention in the counting of the very low energy radiation of tritium requires implementation of the basic teachings of the invention in a manner somewhat different from those thus far described.

One manner of discriminating against noise is obtained by utilizing a separate function generator, shown at FG2, for the lower-level discrimination. One function contour for the lower-level discrimination, mentioned in connection with FIG. 6, is a constant produce $Z_0$ of the individual pulse amplitudes. It can also be shown that the equal probability contour lines for tritium are generally in the form of concentric circular arcs, one of which, $Z_4$, is shown in FIG. 6 as the upper limit of the hatched acceptance zone of a tritium counting system utilizing the invention. (The coordinate scales represented in FIG. 6 are of course greatly expanded as compared with those employed in the representation for carbon-14 in FIG. 10). If the illustrated contour is taken to correspond with the extreme upper end of the tritium spectrum, the advantage of shaping the acceptance limit along this circular arc $Z_4$, as compared to an intersecting chord representing a sum level such as at 110, will exist because more actual tritium pulses are included in the circle segment 113 between chord 110 and arc $Z_4$, with fewer undesired pulses than would alternatively be included in the areas 111 and 112. The number of tritium events below chord 110 and the number of tritium events below arc $Z_4$ are defined as being equal to each other. Such a discrimination characteristic as arc $Z_4$ may be obtained by analog computation of the sum of the squares of the individual tube outputs and comparison of this sum with a fixed maximum discrimination level, as indicated by the legend in the drawing. As shown in FIG. 6, the lower discrimination limit $Z_0$ may, as also indicated by the legend in the drawing, be fixed by analog multiplication of the two pulse values and comparison of the product with a minimum value. In this case there is a range of lower-level sums in which the permitted inequality increases with the sum, while the opposite is the case in the upper-level discrimination.

The lower level discrimination, function $Z_0$, as illustrated in FIG. 6 may be used in function generator FG2 for simplicity of circuit design. The computed value of the function is fed to a threshold discriminator in the usual coincidence system 56, which requires appropriate signals from all these inputs to pass the pulse. This function generation system effectively increases the required threshold value to a maximum value at the sum corresponding to the minimum possible acceptance sum and gradually reduces the threshold value required from each tube at higher sums. It is of course effective only in a channel where the value of Z is eliminated as a lower-level discrimination criterion by setting of the lower level of the Z window below the equal-pulse threshold fixed by FG2.

While FG2 has heretofore been described in conjunction with FG1, FG2 can also be used without FG1. In this instance FG2 could generate a function defining variable threshold amplitude levels, such as those depicted by the lines $(Y - X) - k(X + Y)$ and $(X - Y) - k(X + Y)$ in FIG. 5. Constant minimum and maximum pulse amplitude sums, such as $Z_5$ and $Z_3$ respectively in FIG. 5, would then be defined in the level discrimination means 63, and FG1 could be deleted entirely or replaced by a summing circuit.

In the FIG. 5, the function generating means includes a function defining circuit which defines the permissible pulse amplitude differential as the absolute value of the amplitude difference in voltage pulses less the quantity of a fractional constant multiplied by the amplitude sum of the voltage pulses. That is, the permissible pulse amplitude differential is equal to the quantity
$$|X - Y| - k(X + Y)$$
where X and Y are pulse amplitudes and $k$ is a fractional constant.

Figure 2:
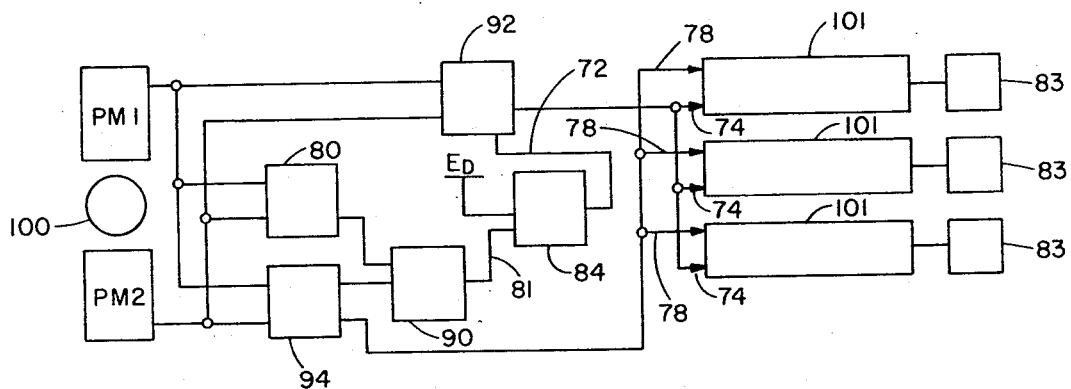
FIG. 2 is an alternative preferred embodiment of the liquid scintillation counter of FIG. 1.

A block diagram of the scintillation counting apparatus producing the acceptance area of FIG. 5 is illustrated in FIG. 2. Two photomultipliers PM1 and PM2 are interconnected to generate coincident input voltage pulses in response to scintillations in sample 100. A pulse summing means 94 is connected to the photomultipliers for producing a pulse sum. The system includes pulse height analysis means equipped with multichannel analyzers 101, each having upper and lower pulse sum discriminators connected to the photomultipliers PM1 and PM2 through pulse summing means 94. Pulse counting means 83 tabulate detected coincident pulses having acceptable pulse energy characteristics according to the pulse height analysis means. A function generating means 90 determines the permissible input voltage pulse differential limit according to the pulse sum. A reference voltage $E_D$ is supplied to voltage comparator means 84 for comparing the reference voltage $E_D$, with the value of the function generated by function generator 90. Comparator 84 has output gating leads to the coincidence detection and threshold comparison means 92. Comparator means 84 has signal generation means actuated to produce disabling signals on lead 72 only when the permissible input voltage pulse differential limit is less than the reference voltage $E_D$. Comparator 84 thereby blocks tabulation of those coincident pulses having an actual pulse differential greater than the permissible pulse differential limit.

The schematic diagram of the summing means 94, the subtracting means 80, and the function generating means 90 is illustrated in FIG. 3. The negative X and Y inputs from PM1 and PM2 respectively, through suitable preamplifiers are fed from the photomultipliers to a combining means for receiving signals representing pulse amplitude difference and pulse amplitude sum in two paths, through the subtracting means and the summing means respectively. The first input path, through respective capacitors C3 and C25 and resistors R22 and R23, is to the portion of the circuit which produces an output pulse proportional to the absolute value of the difference, this being the circuit of transistors Q13 through Q19, now to be described.

The Y pulse is amplified and appropriately stretched in duration in a two-stage negative-feedback amplifier employing complementary transistors Q16 and Q17. Q16 is a grounded-emitter PNP with the base bias fixed by resistor R37 connected to the positive supply and negative feedback resistor R41. The collector resistor R42 is connected to the negative supply. the Second stage NPN transistor Q17 has its collector resistor R40 connected to the positive supply and its emitter resistor R43 connected to the negative supply, its base being direct coupled to the collector of Q16. A high-frequency bypass capacitor C38 shunts the feedback resistor R41 connected between the emitter of Q17 and the base of Q16 to delay the pulses. The negative pulse output of the amplifier is brought out through capacitor C32 connected to the collector of Q17.

The amplifier for the X signal has stages Q14 and Q15 essentially identical with the corresponding stages Q16 and Q17, but with all polarities reversed. The symmetrical complementary balance of the amplifiers is maintained throughout, the collector resistor R29 and the base bias resistor R32 of NPN Q14 being the same values as the corresponding components of PNP Q16. Similarly, the values and connections of the emitter resistor R34, the collector resistor R36, and the output capacitor C30 of the PNP transistor at Q15 are identical to those of the NPN transistor Q17. The feedback network R33 and C28 of this circuit is likewise the same, with the exception that the capacitor C28 is made variable to permit adjustment of the pulse delay. The negative X input is not directly to the amplifier Q14, an inverter stage Q13 being inserted to render the output subtractive. The inverter stage Q13 is a PNP operated with ground emitter and having the base and collector, respectively, connected to the junction points of bias resistor R27, feedback resistor R28 and collector resistor R31 connected between the positive and negative supplies. The output of the unity gain inverter is through a capacitor C26 and a resistor R30 to the base of Q14.

The positive and negative supplies are provided with filters R44 and C31 and R50 and C27 to isolate the amplifiers from the following stages. The positive pulse output from Q15 is through a capacitor C30 which is connected to capacitor C32 to produce a difference current at the junction. A balancing network, consisting of capacitors C29 and C37, resistors R35 and R39, and a center potentiometer R38, having its tap grounded, is connected between the emitters of Q15 and Q17 to eliminate any residual unbalance. The circuit is balanced by adjusting R38 to produce macimum counting-rate, i.e., minimum tripping of the limit discriminator inhibiting the coincidence system; in this manner any slight unbalance of either amplifier gain or photomultiplier gain is simply compensated by utilizing the inherent properties of the system.

The net current output of the amplifiers appears at the junction of oppositely polarized diodes CR11 and CR12. When X is smaller than Y, conduction is through CR11, which is at the input to a current inversion amplifier consisting of Q18 and Q19, again of complementary construction. The current input is to the base of Q18, of which the emitter is grounded and collector resistor R51 is connected to the negative supply. The base of Q19 is direct-coupled to the collector of Q18 and its collector is connected to the positive supply, its emitter being connected to the negative supply by emitter resistor R52. The emitter of Q19 is connected to the input at the base of Q18 through a resistor R47 and a parallel stretching network R46 and C33, a small bypass capacitor C34 shunting this network. These elements, along with a resistor R45, connected to the positive supply, also fix the base bias of Q18. Output of Q19 is through a resistor R48 and capacitor C39 to the emitter of a combining circuit transistor Q20. If X is greater than Y, the inverter circuit of Q18 and Q19 is inactive, and the difference current fom the X and Y amplifiers flows through CR12 and capacitor C40 to the combining circuit input. A high-value resistor R49 connected to the negative supply, maintains the diode CR12 at appropriate potential to equalize the operating conditions of the oppositely connected diodes CR11 and CR12.

It will thus be seen that the output of the circuit thus far described is a multiple of the absolute difference between the X and Y pulses, the sign of the difference determining whether the output current is fed through capacitor C39 or C40. A diode CR14 bypasses any reverse-polarity component of the input to the combining amplifier Q20.

The individual pulses from X and Y are also fed to the emitter of combining amplifier Q20, and to the multichannel analyzers through leads 78, through respective resistors R24 and R25 and respective capacitors C4 and C12, which together comprise summing means 94. The emitter resistor 53 of NPN Q20, which is operated with grounded base, is connected to the negative supply, and a small capacitor C11 shunts the emitter to ground. The collector resistor R60 is connected to the positive supply and the collector is also connected through a diode CR47 to a tap on the positive supply.

With this combining amplifier arrangement, the signals from the X and Y inputs and the amplified difference current produced by the input corresponding to the sign of the difference are additively combined with each other to form a composite signal transmitted, as a voltage across resistor R60 which is fed to the comparator 84 on line 81. This signal is representative of a function having a term proportional to the absolute value of the amplitude difference between the input voltage pulses and having another term proportional to the amplitude sum of the input voltage pulses. Each term of the function of course has a multiplier determined in one case by the gain and in the other by the attenuation, in the handling of the original X and Y signals.

With the circuit as thus constructed, there results a discrimination system which does not permit counting of any coincident pulses which do not meet the requirement that the absolute value of the difference minus a constant times the sum not exceed a given limit. That is, if the value of the function $|X - Y| - k(X + Y)$ exceeds a preset level. Then the pulses are outside the boundary as defined by the threshold limits and as shown in FIG. 5, and therefore will be rejected. As will be seen from FIG. 5 the ratio of the gain produced for the absolute difference signal to the attenuation produced for the sum signal at the input to the final combining amplifier determines the slope of the differential limit.

A set of components for the circuit of FIG. 3 which has been found to produce a high degree of improvement with any of the photomultiplier types commonly used in liquid scintillation counting, is:

Transistors:
  Q13, Q15, Q16, Q18 — Motorola MPS6523
  Q14, Q17, Q19, Q20 — Motorola MPS6521

Resistors (ohms — asterisks indicate 1 percent):

| R22 | 4.99K* | R34 | 2.2K | R45 | 10K |
|---|---|---|---|---|---|
| R23 | 4.99K* | R35 | 169* | R46 | 6.2K |
| R24 | 825* | R36 | 1.5K | R47 | 316* |
| R25 | 825* | R37 | 12K | R48 | 316* |
| R27 | 4.7K | R38 | 100 | R49 | 1.2M |
| R28 | 2.0K* | R39 | 169* | R50 | 100 |
| R29 | 3.3K | R40 | 1.5K | R51 | 4.7K |
| R30 | 2.0K | R41 | 6.34K* | R52 | 1.0K |
| R31 | 1.0K | R42 | 3.3K | R53 | 10K |
| R32 | 12K | R43 | 2.2K | R60 | 4.99K* |
| R33 | 6.34K* | R44 | 100 | | |

Capacitors (mf. except as stated):

| C3 | 0.47 | C30 | 0.05 |
|---|---|---|---|
| C4 | 0.47 | C32 | 0.05 |
| C11 | 500 pf. | C33 | 0.47 |
| C12 | 0.47 | C35 | 0.1 |
| C25 | 0.47 | C37 | 0.47 |
| C26 | 0.47 | C38 | 5 pf. |
| C27 | 1.0 | C39 | 0.47 |
| C28 | 5–18 pf. | C41 | 0.1 |
| C29 | 0.47 | C34 | 10 pf. |

Diodes:
  1N916 except CR14 (979)

Power supply:
  12 volts, positive and negative

FIG. 11 illustrates more generally than FIG. 3 the circuitry required for producing a voltage of amplitude magnitude equal to:

$$|X - Y| - k(X + Y)$$

where $A_1$ and $A_4$ through $A_8$ are conventional amplifiers having appropriate gains.

With the embodiment of the invention just described, it is found that there can be achieved an improvement over the conventional system in the neighborhood of 40 percent in the $E^2/B$ ratio in the counting of carbon-14 with a high-grade summation system, with lesser, but nevertheless applicable, improvement in the counting of other isotopes.

The comparison of the individual amplitudes to distinguish, on a probability basis, between events producing pulses of the same sum, which is the essence of the invention in its broader aspects, can also be advantageously employed in connection with quench correction. A known imperfection of present quench correction measurements lies in the inability to distinguish between quenching effects produced by various types of internal properties of the sample. The accuracy of the most convenient present quench correction measurements relies on the user's knowledge of the factors producing the quench. The relative pulse-height information may be seen to be usable in establishing such distinction. Certain forms of quenching, for example, may affect only the intensity of the emitted light, by absorbing the beta-ray energy, without producing substantial attenuation of the light produced. On the other hand, another form of quenching is mere unclarity of the fluid attenuating the light. It will be seen that scintillations occurring near the wall of a sample-bottle should produce, for any given sum, a substantially different probability distribution for one type of quench than for another. By adding to a counting system with a quench correction a provision for measuring shifts of equal probability lines a pulse height spectrum, statistical isolation may be produced between quenching produced by one cause and quenching produced by another. This may of course be implemented in a large variety of ways. As one example, there may be added to any system a provision for separately counting the pulses which fall within and without particular differential limits. The ratio of the "channels" thus formed, and its relation to the gross quench, may be employed to identify, by usual calibration procedure, the type of quench producing the spectrum shift shown by, for example, a conventional "channels ratio" quench measurement. The conventional quench measurement may thus be calibrated, by use of known samples, in terms of the quench correction indicated for the particular type (or types) of quenching indicated by the "equal-unequal" ratio, rather than employing only a cause-independent "universal" quench correction with samples of unknown or mixed quench effects. In brief, the required quench correction may be more accurately indicated by a combination of the two measurements than by the present quench correction measurement alone. With the same general effect, the counting may be compared with the overall counting rate for identification of the quench type, or other variants may be employed.

Obviously, utilization of the invention is not limited to the two-tube coincidence systems now universally used, but can be employed with more than two tubes if and when it is desired to build systems employing more than two tubes for forming coincidences.

Referring now to FIG. 10, the equal-probability or equal-density contours of carbon-14 are roughly of the shape depicted by lines 102, three being shown. In FIG. 10, successively smaller contours represent higher densities of actual radioactive events. To approximate a line of equal probability, a half-oval or ellipse is chosen extending symmetrically along the 45° pulse equality line. An example is the half ellipse 103. A function generating means may be constructed so as to define an acceptable area for pulses conforming to the line 103. In this instance, the function generating means, besides acting to establish a permissible pulse differential establishing means, also acts to establish an upper pulse amplitude sum level. In measuring the beta emission of carbon-14, the function generator defines an acceptance area in the form of an acceptance area having a minor axis and a limiting major axis. Inclusion of the coincident pulses within the upper boundary of acceptance is determined from a comparison with the limiting major axis of a quotient of the amplitude sum of the coincident voltage pulses divided by the square root of the quantity two minus the square of the voltage pulse amplitude differential divided by the minor axis. That is, a computed value according to the following equation is compared against the limiting major axis:

$$\frac{X+Y}{\sqrt{2-\frac{(X-Y)^2}{W^2}}}$$

where X and Y are the pulse amplitudes, and W is the minor axis.

It will be obvious upon study that the characteristics of FIGS. 4 through 6 and FIG. 10 are merely exemplary of a large numbe of manners of obtaining improved noise discrimination in accordance with the invention as compared with a conventional sum discrimination system. In FIG. 7 is shown an acceptance restriction characteristic wherein the coincident pulses are excluded from counting if either exceeds a fixed value. With a suitably selected limit, the addition of this upper limit to a conventional sum system will produce appreciable noise reduction for carbon-14 counting, although less than in the case of the differential limits of FIGS. 4 and 5; such a limit must not, of course, be effective in the counting of any isotope of higher energy than that for which it is set. FIG. 9 shows the interaction of such fixed individual limits with an upper-level sum discriminator. Such discrimination criteria, it will be noted, represent a rough approximation to the upper-level equal-probability characteristic of tritium pulses as shown in FIG. 6, and an even closer approximation of this may be obtained by canting the individual pulse limits as shown in FIG. 8.

It will become apparent after study that exact optimization of discrimination against noise on a probability basis is extremely complex; particularly in the region of smallest acceted sums. Theoretically, there can be defined a fully optimum boundary between signal pulses and noise pulses. In such a theoretical optimum boundary, the maximum permitted difference or ratio of X and Y pulses for every sum value would lie at the points at which either expansion or contraction of the acceptance zone would reduce the overall factor of merit. Determination of the theoretical optimum pattern of division between acceptance and rejection can in principle be made for each isotope with any given system. However, the delineating of the boundaries of the acceptance zone which is theoretically optimum for any given set of counting conditions is an extensive experimental task which is not in general warranted, both because the design of readily settable discriminator systems capable of forming complex-shaped acceptance areas in the X, Y plane is difficult and because the added benefit obtained as compared with simpler embodiments of the invention, is relatively small, particularly when it is observed that in practical counting, there are variables such as sample quenching.

Many other uses for the information contained in the equality distribution of pulses of any given sum or range of sums, concerning identification or more exact identification of the nature of the events counted, will be found as the teachings of the invention are hereafter utilized in various forms. Accordingly, the scope of the invention should be in no way limited by the particular embodiments herein illustrated and described, or the manner in which they are presently used.

I claim as my invention:

1. In a method of radioactivity measurement comprising exposing a plurality of photodetectors to scintillations occurring in response to radioactive emissions to produce a plurality of contemporaneous individual voltage pulses to be analyzed in combinations of two; and generating electrical output signals from said photomultiplier proportional to the respective amplitudes of coincident pulses that exceed predetermined prerequisite threshold amplitudes, the impovement wherein discrimination is made between combinations of pulses on the basis of the probability of occurrence of a radioactive event having the pulse amplitudes produced, as opposed to the probability of occurrence of background events having the same pulse amplitudes, by accepting coincident pulses conforming to a function that includes at least a major portion of pulse combinations having at least a prerequisite probability of occurrence of a radioactive event, and by rejecting those coincident pulses failing to conform to the aforesaid function whereby output signals to a scintillation counter are produced representing those coincident pulses which are accepted.

2. A method according to claim 1 wherein said function is defined, between upper and lower limits of pulse amplitude sums to include a larger portion of those pulse combinations in which the coincident pulses differ from each other by no more than a maximum amplitude differential.

3. A method according to claim 2 wherein said maximum amplitude differential is determined by reference to and dependence upon the aforesaid prerequisite probability of occurrence of a radioactive event.

4. A method according to claim 1 wherein discrimination is made between combinations of pulses generated from scintillations produced in response to beta emissions of different isotopes on the basis of the relative probability of occurrence in each isotope of a radioactive event that generates the pulse amplitudes produced.

5. A method according to claim 1 wherein one of the activities measured is the beta emission of tritium, and the aforesaid function is defined to have an upper limit of acceptance, and inclusion of the coincident pulses within the function is determined by comparison of the square root of the sum of the squares of the coincident pulse amplitudes with said upper limit of acceptance.

6. A method according to claim 1 wherein one of the activities measured is the beta emission of carbon-14, and the aforesaid function is defined to have an upper boundary of acceptance in the form of an eliptical configuration having a minor axis and a limiting major axis, and inclusion of the coincident pulses within the upper boundary of acceptance is determined from a comparison with the limiting major axis of a quotient of the amplitude sum of the coincident voltage pulses divided by the square root of the quantity two minus the square of the quotient of the voltage pulse amplitude differential divided by said minor axis.

7. A method according to claim 1 wherein said function is defined to have a lower limit that increases linearly with an increasing amplitude sum of coincident pulses.

8. In a liquid scintillation counting apparatus having a chamber adapted to receive a sample to be measured, first and second photodetectors for producing electrical voltage pulses in response to and in a magnitude proportional to energy emitted by scintillations in said sample, coincidence detection means including an adjustable minimum level discriminator, a pulse summing circuit, and level discrimination and counting means, the improvement wherein said minimum level discriminator further comprises a first automatically adjustable function generating means including a function defining circuit which defines the minimum pulse acceptance level as the difference between the amplitudes of the voltage pulses from the photodetectors minus a constant in order to establish a minimum pulse acceptance level as controlled by the pulse sum of voltage pulses from the photodetectors.

9. In a liquid scintillation counting apparatus having a chamber adapted to receive a sample to be measured, first and second photodetectors for producing electrical voltage pulses in response to and in a magnitude proportional to energy emitted by scintillations in said sample, coincidence detection means including an adjustable minimum level discriminator, a pulse summing circuit, and level discrimination and counting means, the improvement wherein said minimum level discriminator further comprises a first automatically adjustable function generating means for establishing a minimum pulse acceptance level as controlled by the pulse sum of voltage pulses from the photodetectors, and wherein said level discrimination and counting means has a second function generating means for establishing a portion of said minimum pulse acceptance level and said first function generating means establishes an upper pulse acceptance boundary over an upper range of pulse sums and said second function generating means establishes a lower pulse acceptance boundary over a lower range of pulse sums and said second function generating means establishes a permissible pulse amplitude differential at said lower pulse acceptance boundary that varies in accordance with the pulse amplitude sum and the first function generating means establishes a permissible pulse amplitude differential at said upper pulse acceptance boundary that diminishes with increasing pulse amplitude sum.

* * * * *